United States Patent
Sato et al.

(10) Patent No.: US 8,927,858 B2
(45) Date of Patent: Jan. 6, 2015

(54) ELECTRIC JUNCTION BOX

(75) Inventors: Koki Sato, Kakegawa (JP); Takeshi Onoda, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 112 days.

(21) Appl. No.: 13/067,955

(22) Filed: Jul. 11, 2011

(65) Prior Publication Data

US 2012/0018185 A1    Jan. 26, 2012

(30) Foreign Application Priority Data

Jul. 22, 2010    (JP) .................................. 2010-164788

(51) Int. Cl.
*H02G 3/08*    (2006.01)
*B60R 16/023*    (2006.01)

(52) U.S. Cl.
CPC .............. *H02G 3/08* (2013.01); *B60R 16/0238* (2013.01)
USPC ................ 174/50; 220/3.7; 174/72 A; 174/60

(58) Field of Classification Search
USPC ............. 174/17 CT, 50, 57, 58, 60, 64, 72 A; 220/3.7, 3.8; 312/223.1, 223.6; 439/76.1, 76.2
See application file for complete search history.

(56) References Cited

U.S. PATENT DOCUMENTS

| | | | | |
|---|---|---|---|---|
| 4,619,332 A | * | 10/1986 | Sheehan ........................ | 174/659 |
| 6,056,587 A | * | 5/2000 | Matsuoka et al. ............. | 439/464 |
| 7,507,905 B2 | * | 3/2009 | Kanamaru et al. ............. | 174/50 |
| 7,566,829 B2 | * | 7/2009 | Nakayama et al. ............. | 174/50 |
| 7,622,674 B2 | * | 11/2009 | Kanamaru et al. ............. | 174/50 |
| 7,893,364 B2 | * | 2/2011 | Oda ............................... | 174/520 |
| 7,964,796 B2 | * | 6/2011 | Suzuki .......................... | 174/72 C |
| 8,163,994 B2 | * | 4/2012 | Taniguchi et al. .............. | 174/50 |
| 2005/0092506 A1 | * | 5/2005 | Hull et al. ........................ | 174/50 |
| 2006/0089021 A1 | * | 4/2006 | Kanamaru ..................... | 439/76.2 |
| 2007/0249189 A1 | | 10/2007 | Kaneko et al. | |

(Continued)

FOREIGN PATENT DOCUMENTS

| | | |
|---|---|---|
| EP | 0865131 A1 | 9/1998 |
| JP | S55-153713 U | 11/1980 |
| JP | H09-191527 A | 7/1997 |
| JP | 2002-305823 A | 10/2002 |
| JP | 2004-072848 A | 3/2004 |

(Continued)

OTHER PUBLICATIONS

English translation of the Office Action mailed Oct. 8, 2013, issued for the Chinese patent application No. 201110205841.2.

(Continued)

*Primary Examiner* — Hoa C Nguyen
*Assistant Examiner* — Amol Patel
(74) *Attorney, Agent, or Firm* — Edwards Wildman Palmer LLP

(57) ABSTRACT

There is provided an electric junction box for ensuring a watertight performance even when a harness with various thickness is applied, including a box body, a tubular guide portion projecting from the box body and guiding a harness out of the box body, wherein the guide portion is provided with a plurality of wall portions, divided along the axial direction of the guide portion, and at least one of the wall portions is provided with a movable spurtle as a spurtle and a bending portion formed between the movable spurtle and the box body elastically deformable in the outside direction of the guide portion, and wherein the inner diameter of the guide portion in neutral state that the bending portion is not in elastic deformation is formed to fit the harness with a minimum outer diameter.

5 Claims, 8 Drawing Sheets

(56) References Cited

U.S. PATENT DOCUMENTS

| | | |
|---|---|---|
| 2008/0257600 A1 | 10/2008 | Kanamaru et al. |
| 2010/0136805 A1 | 6/2010 | Maebashi |
| 2010/0147584 A1 | 6/2010 | Suzuki |
| 2010/0236826 A1 | 9/2010 | Suzuki |
| 2012/0000686 A1* | 1/2012 | Soh et al. ............... 174/50 |
| 2012/0043104 A1* | 2/2012 | Takeuchi et al. ......... 174/50 |
| 2012/0073852 A1* | 3/2012 | Makino et al. ........... 174/53 |
| 2012/0267163 A1* | 10/2012 | Takeuchi et al. ......... 174/660 |

FOREIGN PATENT DOCUMENTS

| | | |
|---|---|---|
| JP | 2006-345616 A | 12/2006 |
| JP | 2006345616 A * | 12/2006 |

OTHER PUBLICATIONS

European Search Report dated Nov. 25, 2013, issued for the European patent application No. 11174951.1.
Chinese Office Action dated May 14, 2014, issued for corresponding Chinese Patent Application No. 201110205841.2.

* cited by examiner

ELECTRIC JUNCTION BOX

CROSS REFERENCE TO RELATED APPLICATIONS

This application is on the basis of Japanese Patent Application NO. 2010-164788, the contents of which are hereby incorporated by reference.

BACKGROUND OF THE INVENTION

1. Field of the Invention

The present invention relates to an electric junction box attached to an inside of an engine of a vehicle.

2. Description of the Related Art

Various electric devices are mounted on a vehicle as a moving object. For supplying electric power to these various electric devices, an electric junction box composed intensively of electric parts such as connector, relay, and fuse is disposed on a proper position between a battery and the electric devices in the vehicle.

Note that the electric junction box is also referred to as a junction block, a fuse block, or a relay box. These junction block, fuse block, and relay box are herein collectively called as the electric junction box.

FIG. 11 is a perspective view showing a part of conventional electric junction box. FIG. 12 is a perspective view showing a bottom wall portion that configures a guide portion of the conventional electric junction box shown in FIG. 11. The conventional electric junction box 101 shown in FIGS. 11 and 12 includes: a box body 102 formed in a box shape, and accommodating various electric parts (not shown) therein; and a guide portion 106 projecting from the box body 102 and guiding a harness 7 out of the box body 102.

The guide portion 106 is formed in the square tubular shape by a gutter-shaped portion 160 and a bottom wall portion 163. The guide portion 106 is also formed to taper as approaching an end portion 106a away from the box body. The bottom wall portion 163 is provided with a fixing spurtle 165 sloping in the inside direction of the guide portion 106 as approaching the end portion 106a of the guide portion 106, and a base 164 provided between the fixing spurtle 165 and the body box 102.

The harness 7 connects the electric device to various electric parts accommodated inside the box body 102. The harness may be applied to the electric device mounted on the vehicle, and adopt various outer diameters (thickness), i.e., the number of electric wires to be tied, in accordance with the grade and the specification of the vehicle. Accordingly, the inner diameter of the guide portion 106 of the conventional electric junction box 101 is formed to fit the harness 7 with a large diameter (thick) in order to being applied to the harnesses 7 of the various outer diameters in accordance with the grade and the specification of the vehicle (for example, see Patent Document 1).

[Patent Document 1] JP, A, 2006-345616

However, in the conventional electric junction box 101, there is a problem described below. Namely, because the diameter of the guide portion 106 of the conventional electric box 101 is formed to fit the harness with a large diameter, the gap between the guide portion 106 and the harness 7 with a small diameter (thin) is widened when the harness with a small diameter is passed through the inside of the guide portion 106, causing the possibility of water penetrating from the gap.

In case that the diameter of the guide portion 106 is formed to fit the harness with a small diameter in order to prevent water from penetrating from the gap, the harness with a large diameter cannot be adversely passed therethrough. Namely, it is not possible for the conventional electric junction box 101 to achieve both to prevent water from penetrating from the gap (securement of watertight performance) and to fit the harnesses 7 with various diameters.

Accordingly, focusing on the above problems, an object of the present invention is to provide an electric junction box having an enhanced watertight performance even if harnesses with various diameters are applied.

SUMMARY OF THE INVENTION

According to the present invention recited in claim 1, there is provided an electric junction box including:

a box body, a tubular guide portion projecting from the box body and guiding a harness therefrom, a plurality of wall portions provided with the guide portion and divided along the axial direction thereof, and a spurtle as well as a bending portion provided with at least one of the plurality of wall portions, the bending portion being formed between the spurtle and the box body elastically deformable in the outside direction of the guide portion, wherein the inner diameter of the guide portion in neutral state that the bending portion is not in elastic deformation is formed to fit the harness with a minimum outer diameter, and the bending portion is bent so that the spurtle is directed outward as the diameter of the harness increases.

According to the present invention recited in claim 2, there is provided an electric junction box according to the invention recited in claim 1, wherein the spurtle includes a stand portion standing from the spurtle and stacked on the inner surface of the adjoining wall portion.

According to the present invention recited in claim 3, there is provided an electric function box according to the invention recited in claim 1 or 2, wherein the guide portion includes a rib formed convexly in the outside direction of the guide portion for preventing a fixing member wound continuously from the guide portion to the harness with the harness through the inside of the guide portion from being dislocated, and the rib is positioned spaced from the end portion that is away from the box body.

ADVANTAGEOUS EFFECTS OF INVENTION

According to the present invention recited in claim 1, since an electric junction box includes a box body, a tubular guide portion projecting from the box body and guiding a harness therefrom, the guide portion being provided with a plurality of wall portions divided along the axial direction of the guide portion, at least one of the plurality of wall portions being provided with a spurtle and a bending portion, the bending portion being formed between the spurtle and the box body elastically deformable in the outside direction of the guide portion, wherein the inner diameter of the guide portion in neutral state that the bending portion is not in elastic deformation is formed to fit the harness with a minimum outer diameter, and the bending portion is bent so that the spurtle is directed outward as the outer diameter of the harness increases. Namely, the increase of the outer diameter of the harness leads the spurtle to be forced in the outside direction of the guide portion and the bending portion to be elastically deformed outward so that the spurtle is pushed outward, and a force of elastic restitution to bias inward is generated. The spurtle therefore closely contacts an outer circumferential surface of the harness without any gap therebetween. Accordingly, there is provided an electric junction box having an enhanced watertight performance to prevent water from penetrating from the gap between the harness and the guide portion through which the harness is passed into the inside of the box body. Furthermore, the electric junction box provided with such a guide portion can widely fit harnesses with various diameters since the elastic deforming of the bending portion permits the spurtle to move in the direction of the guide portion being widened.

According to the present invention recited in claim 2, since the spurtle includes a stand portion standing from the spurtle and stacked on the inner surface of the adjoining wall portion, the stand portion infills the gap between the wall portion and the adjoining wall portion even when the bending portion is bent so that the spurtle is directed outward. Accordingly, there is provided with an electric junction box having an more enhanced watertight performance to prevent water from penetrating from the gap between the wall portion and the adjoining wall portion into the inside of the box body.

According to the present invention recited in claim 3, since the guide portion includes a rib formed convexly in the outside direction of the guide portion for preventing a fixing member from being dislocated, wherein the fixing member is wound continuously from the guide portion to the harness with the harness through the inside of the guide portion, and the rib is positioned spaced from the end portion that is away from the box body, the rib makes a fall (step) between the guide portion and the harness smaller than that with which the rib would be provided on the end portion away from the box body so that the fixing member can be easily wound continuously from the guide portion to the harness without any gap, which can enhance a watertight performance.

DETAILED DESCRIPTION OF THE PREFERRED EMBODIMENTS

Hereafter, an electric junction box according to one embodiment of the invention is described based on the FIGS. 1 to 10. An electric junction box 1 shown such as FIG. 1 supplies power to various electric parts attached to such as a vehicle engine compartment and mounted therein. Note that junction block, fuse block, and relay box are herein collectively called as the electric junction box 1.

Figure 1:
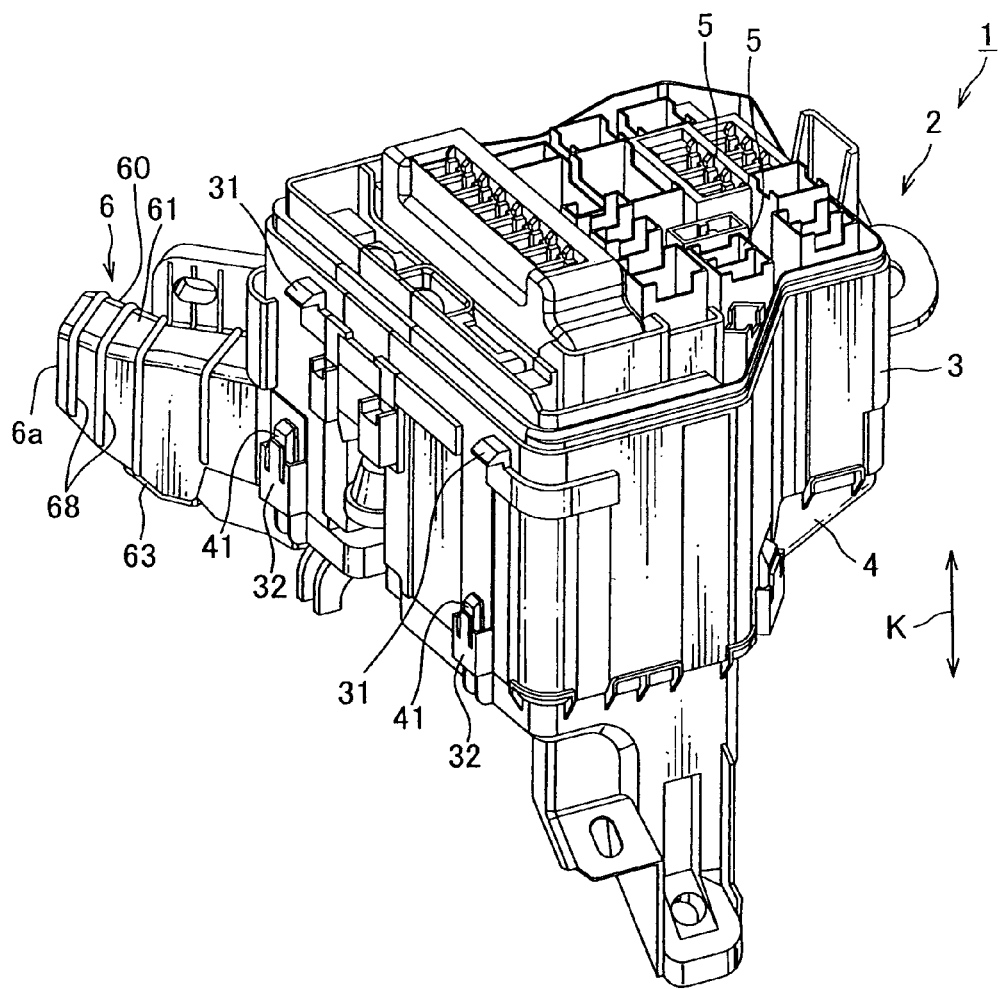
FIG. 1 is a perspective view illustrating an electric junction box according to one embodiment.

The electric junction box, as shown in FIG. 1, includes a box body 2 accommodating a plurality of electric parts, a tubular guide portion 6 projecting from the box body and guiding a harness therefrom, a rib 68 provided with the guide portion 6 and formed convexly in the outside direction of the guide portion 6. An adhesive tape as a fixing member is wound continuously around the outer circumferential surface of the guide portion 6 and the harness 7 from the guide portion 6 to the harness 7 without any gap with the harness through the inside of the guide portion 6.

The box body 2, as shown in FIG. 1, includes a main body 3 formed in the tubular shape, an upper cover (not shown) attached detachably to the main body 3 so as to cover the top surface of the main body 3, a lower cover 4 attached detachably to the main body 3 so as to cover the lower surface of the main body 3 (the side away from the top surface). A plurality of electric parts are populated in a synthetic resin cassette block 5 and accommodated in the box body 2. FIG. 1 shows a state of the upper cover being off. An allow K shown in FIG. 1 shows the direction of the cover 4 approaching the main body 3 or separating therefrom.

The main body 3 is made from synthetic resin and formed by widely known injection molding. The main body 3 is provided with a lock receiver 31 for locking within a lock portion of the upper cover described below, a lock receiver 32 for locking within a lock portion 41 of the lower cover 4 described below.

The upper cover is made from isolating synthetic resin and formed in the tubular shape with bottom by widely known injection molding. The upper cover is provided with a lock portion (not shown).

The lower cover 4 is made from isolating synthetic resin and formed in the tubular shape with bottom by widely known injection molding. The lower cover 4 is provided with a plurality of lock portions 41.

The guide portion 6 guides one end of the harness out of the box body 2 by the one end of the harness being passed through, the other end of which is connected to each electric part. The guide portion 6 communicates with the inside of the box body 2 and the outside thereof. The guide portion 6 is provided such that the longitudinal direction thereof is parallel to the longitudinal direction of the harness passing through the inside of the guide portion 6. Around the outer circumferential surface of the wound portions 61B, 62B, a movable spurtle 65, and the harnesses is wound continuously an adhesive tape 8 without any gap.

The guide portion 6 is formed to taper as approaching an end portion 6a (hereafter, noted as an end portion) away from the box body 2. The width direction perpendicular to the longitudinal direction of the guide portion 6, i.e., "the inner diameter of the guide portion" shown in claims is formed such that the inner diameter of the end portion 6a fits a harness 7 with the minimum outer diameter (thinnest) among a plurality of harnesses 7 with various thickness corresponding to electric devices mounted on the vehicle according to the grade or specification of the vehicle.

Figure 2:
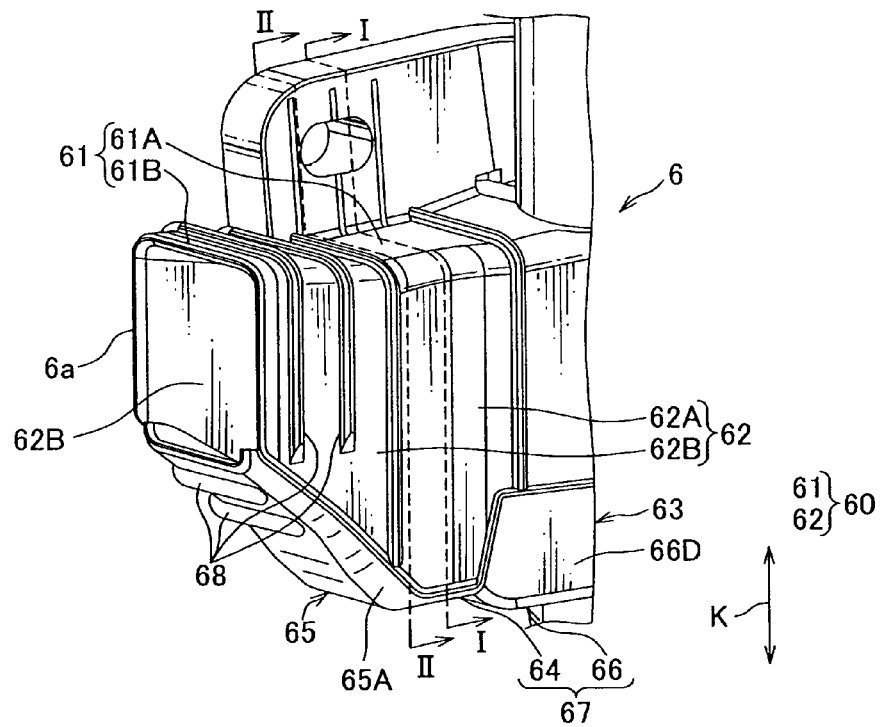
FIG. 2 is an enlarged view illustrating a guide portion that configures the electric junction box shown in FIG. 1.

The guide portion 6, as shown in FIG. 2, is formed in the square tubelar shape, and provided with gutter-shaped portion 60 standing from an edge of a lower surface of the main body 3 in the gutter shape and a bottom wall portion composed of a bending portion 64 mentioned below, standing from the edge of the lower cover 4 stacked on the edge of the lower surface. The gutter-shaped portion 60 and the bottom wall portion 63 correspond to the "a plurality of wall portions" indicated in claims.

The gutter-shaped portion 60 is provided with a plate-like top wall portion 61 and a pair of side wall portions 62 standing in the plate-like shape from both edges of the top wall portion 61 in the circumferential direction and spaced each other.

The top wall portion 61, as shown in FIGS. 1 and 2, provided on the side of the upper cover in the arrow K direction. The top wall portion 61 is provided with a base 61A stretching to the main body 3, a first wound portion 61B stretching to the side of the base 61A away from of the box body 2.

Each of the pair of the side wall portions 62 is provided with a pair of bases 62A stretching to the base 61A, and a second wound portion 62B stretching to both each of the base 62A and the first wound portion 61B. Each edge of the second wound portions 62B away from the top wall portion 61 is cut in the direction of the arrow K approaching the top wall portion 61 as approaching from the end of the base of the second wound portion 62B near the box body 2 toward the end portion 6a of the second wound portion 62B (guide portion 6) away from the box body 2.

Figure 3:
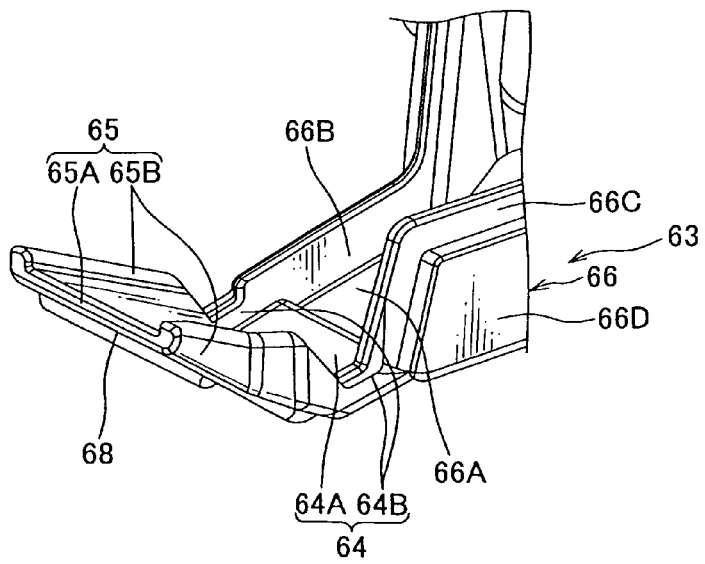
FIG. 3 is a perspective view illustrating a bottom wall portion that configures the guide portion shown in FIG. 2.

The bottom wall portion 63, as shown in FIGS. 2 and 3, is provided with a base 67 composed of a bending portion 64 mentioned below stretching to the lower cover 4 and a movable spurtle 65 as a spurtle stretching to the side of the base 67 away from the box body 2. The base 67 is positioned opposite to the base 61A of the top wall portion 61, and the movable portion 65 is positioned opposite to the first wound portion 61B of the top wall portion 61.

The base 67 is provided with a root portion 66 stretching to the lower cover 4 and a bending portion 64 stretching to the root portion 66, and provided between the root portion 66 and the movable spurtle 65. The root portion 66 is provided with a first plate 66A positioned opposite to the base 61A and a plurality of first stand portions 66B, 66C, and 66D standing from the first plate 66A toward the base 61A.

Each of the first stands 66B and 66D of the plurality of first stands 66B, 66C, 66D, as shown in FIG. 3, stands from both edges of the first plate 66A in the circumferential direction, positioned opposite to each other. The first stand 66D of the first pair of stands 66B, 66D is positioned in the front side in FIG. 2. The first stand portion 66C is provided between the first stands 66A and 66D, positioning the one of the base 62A of the pair of bases 62A between the first stand 66D positioned in the front side in FIG. 2 and itself.

Figure 4:
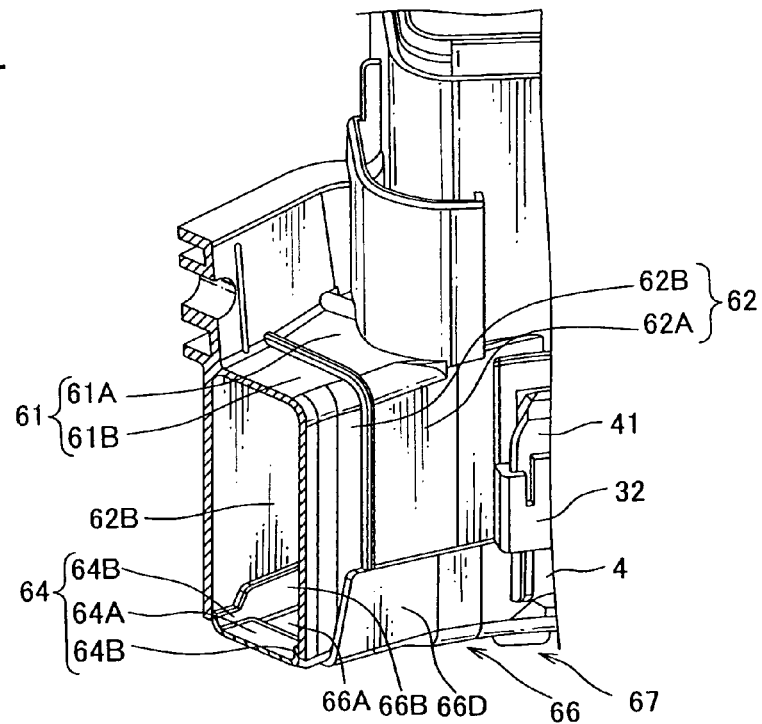
FIG. 4 is a sectional perspective view along I-I line in FIG. 2.

The bending portion 64, as shown in FIGS. 3 and 4, is provided with a second plate 64A stretching to the second plate 64A and formed such that the dimension (width) in the arrow K direction is thicker than that of the second plate 66A, and a pair of second stands 64B each stretching to each of the first stands 66C, 66D and formed such that the dimension (height) in the arrow K direction is lower than that of first stands 66B, 66C, 66D. As mentioned above, since the bending portion 64 is formed such that the dimension (width) in the arrow K direction is thicker than that of the second plate 66A, and dimension (height) in the arrow K direction is lower than that of the first stands 66B, 66C, 66D, the bending portion 64 is formed movably along the arrow K. Namely, the bending portion 64 is formed elastically deformable in the both inside and outside direction (the arrow K direction) of the spurtle portion 6. The pair of the second stands 64B are stacked on the inner surface of the base 62A when positioned between the bases 62A of the pair of side wall portion 62 provided in the gutter-shaped portion 60 mentioned above.

Figure 5:
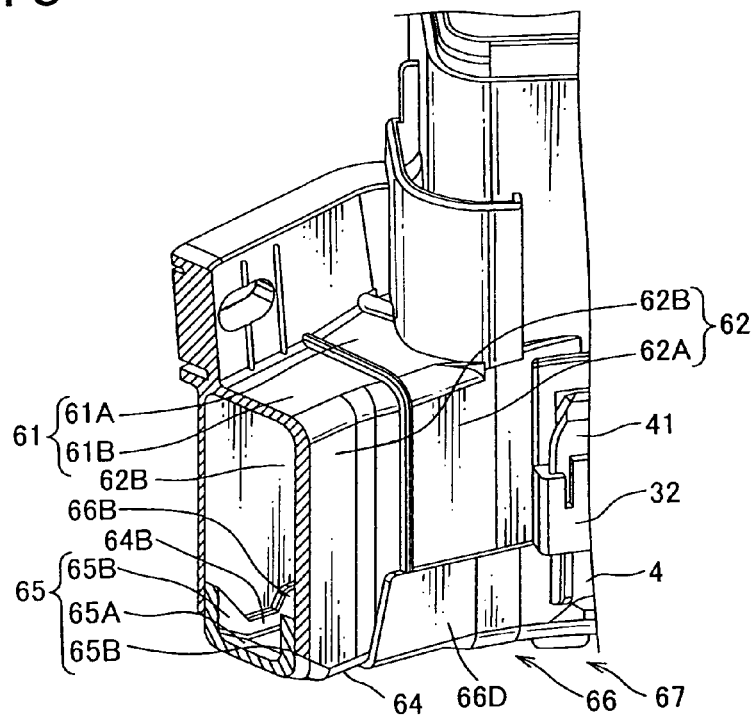
FIG. 5 is a sectional view along II-II line in FIG. 2.

The movable spurtle 65, as shown in FIGS. 3 and 5, is provided with a third plate 65A stretching to the second plate 64A and formed such that the dimension (width) in the arrow K direction is thicker than that of the second plate 64A, and a pair of third stands 65B (corresponding to "a stand" in claims) each stretching to each of the second stands 64B and formed such that the dimension (height) in the arrow K direction is higher than that of the second stand 64B.

The third plate 645A is provided aslope toward the end portion 6a of the guide portion 6 in the inner direction of the guide portion 6 (the arrow K direction).

The pair of the third stands 65B is formed such that the dimension (height) in the arrow K direction increases as approaching the box body 2 from the end portion 6a of the guide portion 6. Each of the pair of third stands 65B is positioned between the second wound portions 62B provided in the each of the pair of the side wall portion 62, and stacked on the inner surface of the second wound portions 62B.

Figure 6:
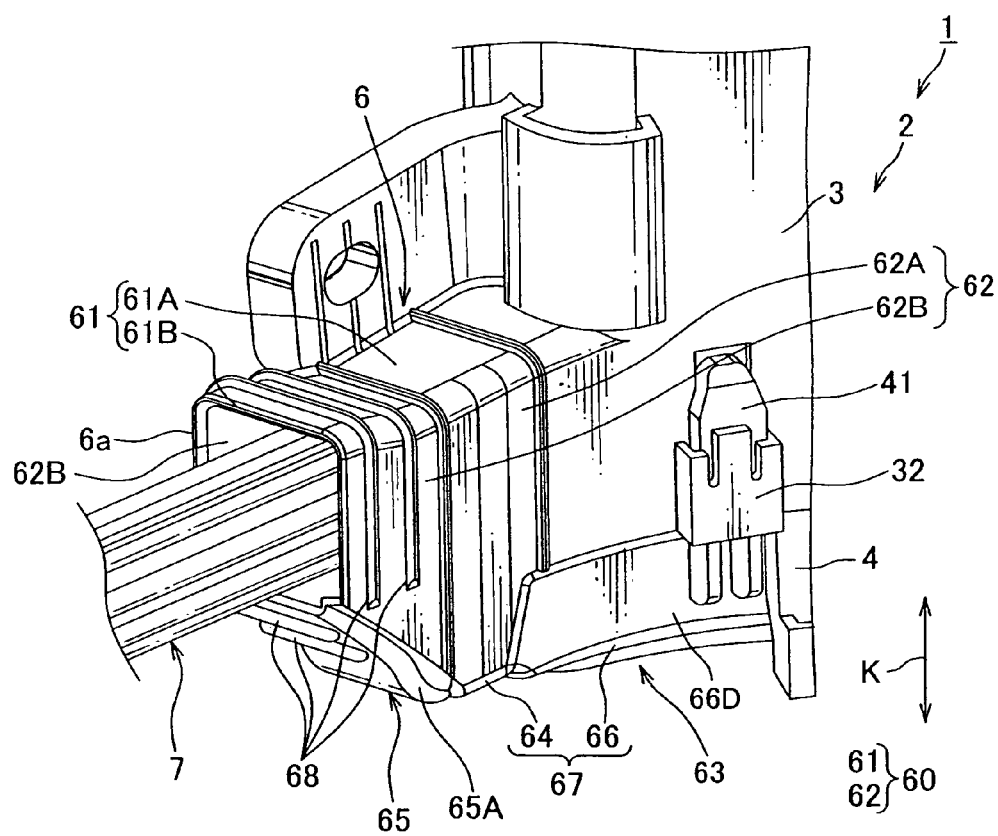
FIG. 6 is a perspective view illustrating the state of a harness having been passed through the guide portion that configures the electric junction box shown in FIG. 1.
Figure 7A:
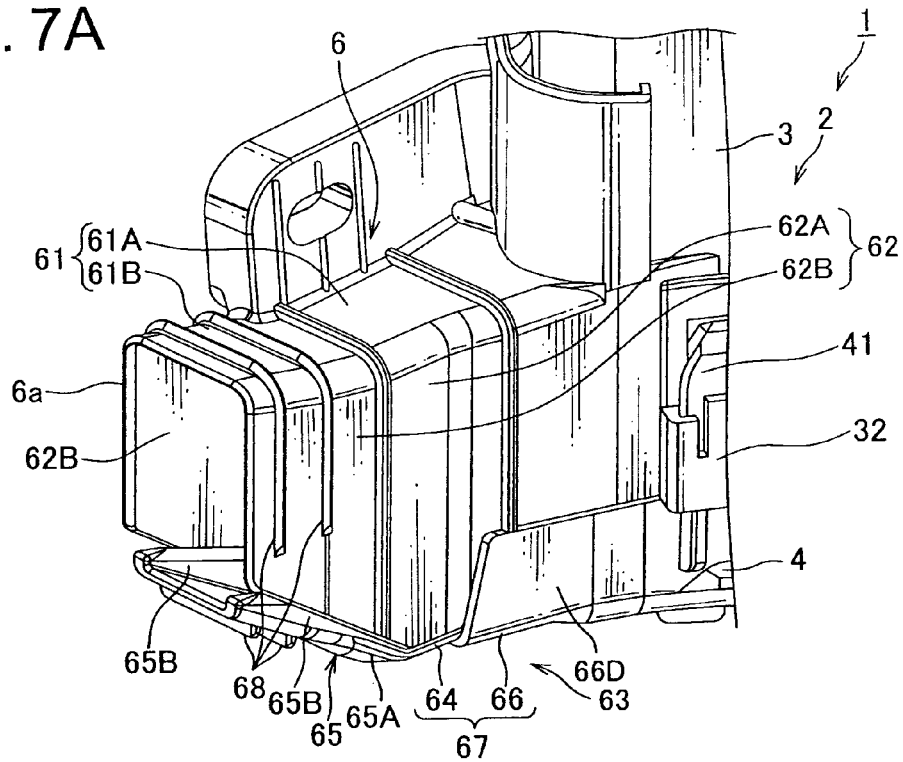
FIG. 7A is a perspective view illustrating the state of a movable spurtle being pushed to be widened, which includes the guide portion that configures the electric junction box shown in FIG. 1.
Figure 7B:
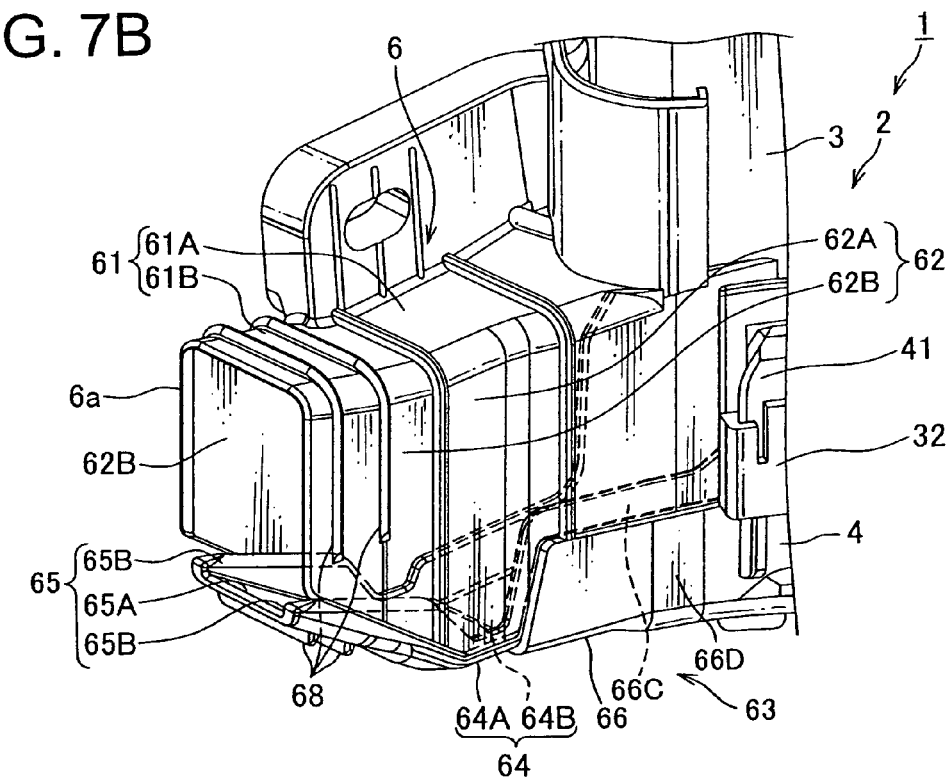
FIG. 7B is a perspective projection illustrating the state of the movable spurtle being pushed to be widened.
Figure 8:
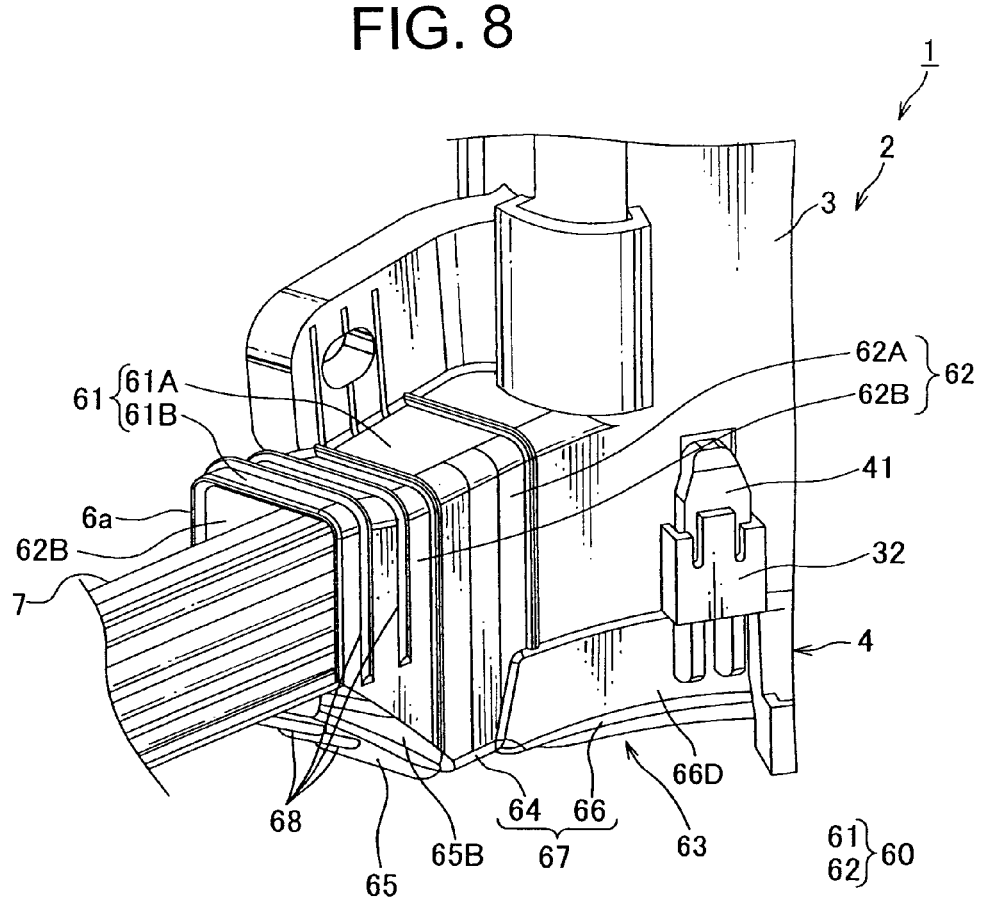
FIG. 8 is a schematic diagram illustrating a state of the harness having been passed through the guide portion shown in FIG. 7.
Figure 9:
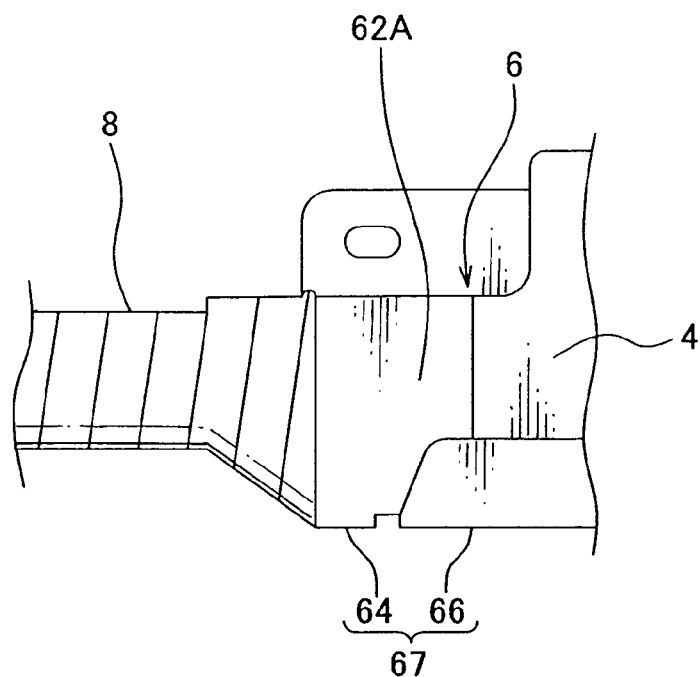
FIG. 9 is a schematic diagram illustrating a state of an adhesive tape being wound around the guide portion shown in FIG. 6.
Figure 10:
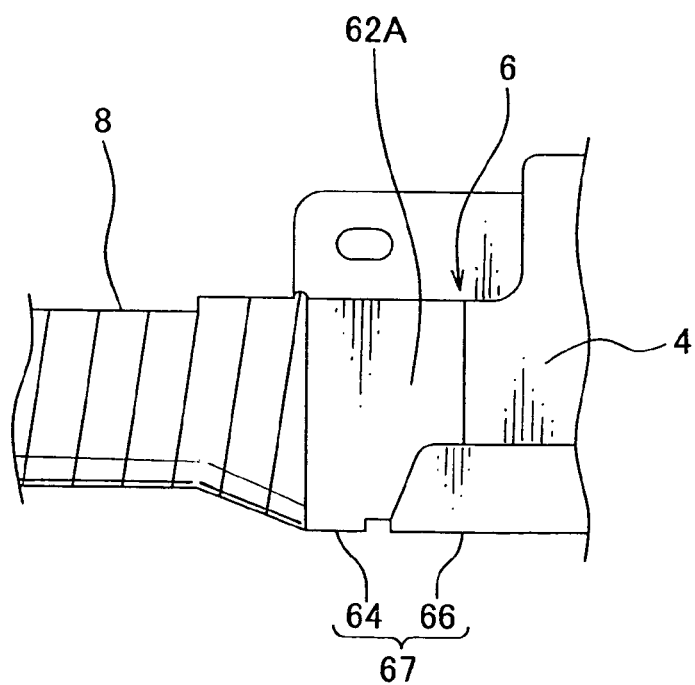
FIG. 10 is a schematic diagram illustrating a state of an adhesive tape being wound around the guide portion shown in FIG. 8.
Figure 11:
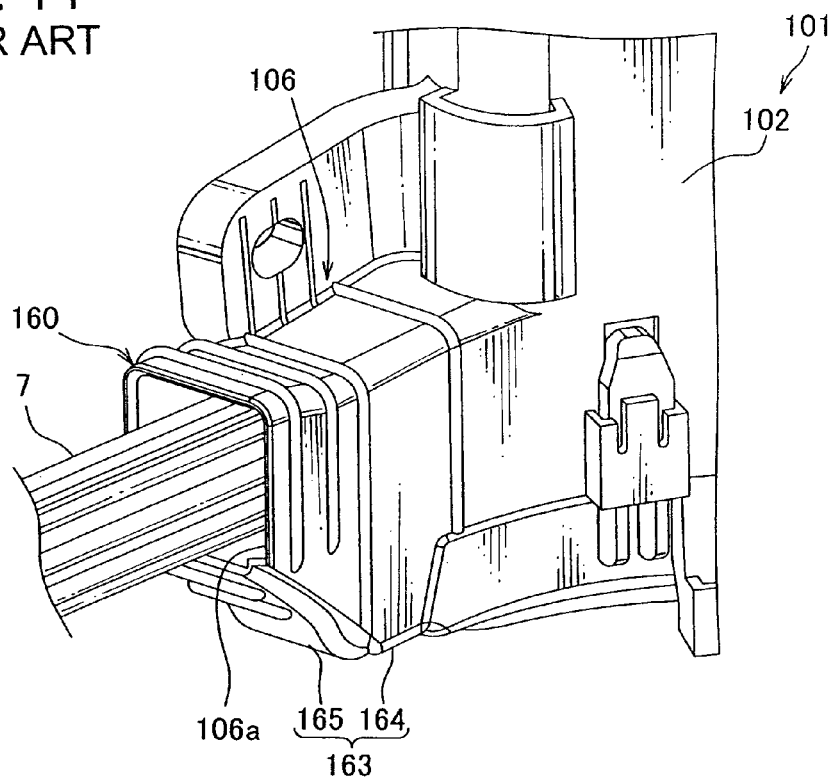
FIG. 11 is a perspective view partly illustrating a conventional electric junction box.
Figure 12:
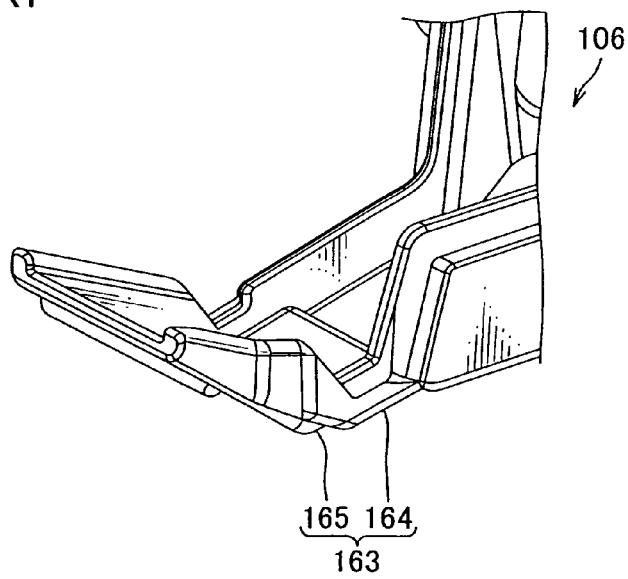
FIG. 12 is a perspective view partly illustrating bottom wall portion that configures the conventional electric junction box shown FIG. 11.

As shown in FIGS. 2 and 6, on the inner surface of the second wound portion 62B is stacked the third stands 65B of the movable spurtle 65 in a state that the harness 7 is not through the guide portion 6 (shown in FIG. 2), or in neutral state that the harness 7 with small diameter (thin) is through the guide portion 6 and the bending portion 64 is not in elastic deformation (shown in FIG. 6). As shown in FIGS. 7 and 8, the movable spurtle 65 is pushed to be widened in the direction of the inner diameter being widened, i.e., the outer direction of the guide portion 6 (the arrow K direction) when the bending portion 64 is in elastic deformation in the outer direction of the guide portion 6 (the arrow K direction), and a gap between the second wound portion 62B, i.e., the gutter-shaped portion and the movable spurtle 65, formed by the movable spurtle 65 being widened is infilled by the third stands 65B.

A plurality of the ribs 68 are provided around the whole circumference of the wound portion 61B, 62B, and the movable spurtle 65, and spaced each other from the position separated from the end portion 6a of the guide portion 6 toward the box body 2. I.e., no rib 68 is provided on the end portion 6a of the guide portion 6. The adhesive tape 8 is wound around the outer circumference of the rib 68, and the rib 68 serves to prevent the adhesive tape 8 from being displaced.

An assembly procedure for the electric junction box 1 mentioned above will be described. First described is a procedure for employing a harness 7 with a small diameter (thin). Each electric part to which one end of the electric wire (harness 7) is connected is mounted to a cassette block 5, and the cassette block 5 to which each electric part is mounted is housed in the main box 3. Or one end of the each electric wire (harness 7) may be connected to each electric part after cassette block 5 to which each electric part is mounted is housed in the main body 3. The other end of the harness 7 to which each electric part is connected is then guided out of the main body 3 through the inside of the gutter-shaped portion 60. The lower cover 4 next approaches so as to cover the lower surface of the main box 3 with the other end of the harness 7 out of the main body 3. On the inner surface of the each second wound portion 62B of the gutter-shaped portion 60 is stacked the third stand 65B of the movable spurtle 65 while the lock portion 41 of the lower cover 4 is locked in the lock receiver 32 of the main body 3, and the guide portion 6 can be thus assembled. At this time, the harness 7 has been passed through inside the guide portion 6, one end of which is connected to each electric part and the other end of which is guided out of the main body 3 (box body 2) (shown in FIG. 6). Furthermore, an adhesive tape 8 as a fixing member is wound continuously around the outer circumference of the wound portions 61B, 62B, the movable spurtle 65 and harness 7 from the wound portions 61B, 62B, the movable spurtle 6 to the harness without any gap with the harness 7 through the inside of the through portion 6 (shown in FIG. 9). At this time, since the wound portions 61B, 62B, and movable spurtle 6 are provided with the rib 68, the adhesive tape is wound around the outer circumferential of the rib 68. Finally, a lock portion of the upper cover is engaged with the lock receiver 31 of the main body 3, and then the box body is assembled, completing the electric junction box. Next described is a procedure for employing a harness 7 with a large diameter (thick). Note that the description may be abbreviated that overlaps the procedure for employing a harness 7 with a small diameter (thin). The lower cover 4 approaches so as to cover the lower surface of the main box 3 with the other end of the harness 7 out of the main body 3. The end portion 6*a* of the movable spurtle 65 then contacts the outer circumference of the harness 7. As the lower cover 4 further approaches, the movable spurtle 65 is pushed (forced) in the outside direction of the guide portion 6, i.e., the direction of the spurtle 6 being widened by the harness 7 (the arrow K direction), and the bending portion 64 is deformed elastically outward. The movable spurtle 65 is thus pushed to be widened so as to be directed outward by the bending portion 64 being deformed elastically outward, and a force of elastic restitution that biases inward is generated in the movable spurtle 65, leading a close contact of the movable spurtle 65 and the outer circumferential of the harness 7 without a gap therebetween. In a state that the moveable spurtle 65 and the outer circumferential of the harness 7 closely contact each other (a state in which the movable spurtle 65 is biased elastically in the inside direction of the guide portion 6), when the lower cover 4 further approaches, lock portion 41 of the lower cover 4 is locked in the lock receiver 32 of the main body 3, and then the guide portion 6 is assembled. At this time, a gap between the second wound portion 62B, i.e., the gutter-shaped portion 60 and the movable spurtle 65 is infilled by the third stand 65B. The harness 7 has been passed through inside the guide portion 6, one end of which is connected to each electric part and the other end of which has been guided out of the main body (shown in FIG. 8). Furthermore, an adhesive tape 8 as a fixing member is wound continuously around the outer circumference of the wound portions 61B, 62B, the movable spurtle 65 and harness 7 from the wound portions 61B, 62B, the movable spurtle 6 to the harness without any gap with the harness 7 through the inside of the through portion 6 (shown in FIG. 10). Finally, a lock portion of the upper cover is engaged with the lock receiver 31 of the main body 3, and then the box body 2 is assembled, completing the electric junction box 1.

According to the embodiment above mentioned, since an electric junction box 1 includes a box body 2, a tubular guide portion 6 projecting from the box body 2 and guiding a harness 7 out of the box body 2, the guide portion 6 being provided with a gutter-shaped portion 60 as a plurality of wall portions divided along the axial direction of the guide portion 6 and a bottom wall portion 63, at least one of the gutter-shaped portion 60 and bottom wall portion 63 being provided with a movable spurtle 65 as a spurtle and a bending portion 64 formed between the movable spurtle 65 and the box body 2 elastically deformable in the outside direction of the guide portion 6, wherein the inner diameter of the guide portion 6 in neutral state that the bending portion 64 is not in elastic deformation is formed to fit the harness 7 with a minimum outer diameter, and the increase of the outer diameter of the harness 7 leads the movable spurtle 65 to be forced in the outside direction of the guide portion 6 and the bending portion 64 to be elastically deformed outward so that the movable spurtle 65 is pushed outward to be widened, and the force of elastic restitution to bias inward is generated. The movable spurtle 65 therefore closely contacts an outer circumferential surface of the harness 7 without any gap therebetween. Accordingly, there is provided an electric junction box 1 having an enhanced watertight performance to prevent water from penetrating from the gap between the harness 7 and the guide portion 6 through which the harness 7 is passed into the inside of the box body 2. Furthermore, the electric junction box 1 provided with such a guide portion 6 can widely fit harnesses 7 with various diameters since the elastic deforming of the bending portion 64 permits the movable spurtle 65 to move in the direction of the diameter of the guide portion 6 being widened (outward direction).

Furthermore, since the movable spurtle 65 includes the gutter-shaped portion 60 standing from the movable spurtle 65 and stacked each other and the third stand 65B as a stand stacked on the inner surface of the bottom wall portions 63, the stand portion 65B infills the gap between the gutter-shaped portion 60 and the adjoining bottom wall portion 63 even when the bending portion 64 is bent so that the movable spurtle 56 approaches outward. Accordingly, it is possible to enhance watertight performance to prevent water from penetrating from the gap between the gutter-shaped portion 60 and the adjoining bottom wall portion 63 into the inside of the box body 2.

Furthermore, since the guide portion 6 includes a rib 68 formed convexly in the outside direction of the guide portion 6 for preventing the adhesive tape 8 as a fixing member from being dislocated, wherein the rib 68 is positioned spaced from the end portion 6*a* that is away from the box body 2, the rib 68 makes the fall (step) between the guide portion 6 and the harness 7 smaller than that with which the rib 68 would be provided on the end portion 6*a* away from the box body 2. Therefore the decrease of the fall easily allows the adhesive tape 8 to be wound continuously from the guide portion 6 to the harness 7, which enhances a watertight performance.

Note that according to the above embodiment, though the guide portion 6 is provided with the bending portion 64 and one bottom wall portion 63 as a wall composed of the movable spurtle 65 as a spurtle, the invention is not intended to limit this configuration, so the guide portion 6 may be provided with two or more of walls (bottom wall portions 63) composed of the bending portion 64 and the movable spurtle 65 as a spurtle.

According to the above embodiment, though the guide portion 6 is provided with the rib 68, the invention is not intended to limit this configuration, so there may be no rib.

Furthermore, according to the above embodiment, though the rib 68 is provided on the wound portion 61B, 62B, the movable spurtle 65 around which the adhesive tape 8 is wound, spaced from the end portion 6*a*, around the whole circumference of the guide portion 6, the invention is not intended to limit this configuration, so the rib 68 may be provided not around the whole circumference. I.e., the rib 68 may be provided on the wound portion 61B, 62B, and the movable spurtle 65 around which the adhesive tape 8 is wound, simply spaced from the end portion 6*a* and provided around one part of the circumference of the guide portion.

Since the embodiment mentioned above only shows a typical configuration of the present invention, it is to be understood that various changes and modifications will be apparent to those skilled in the art. Therefore, unless otherwise such changes and modifications depart from the scope of the present invention hereafter defied, they should be construed as being included therein.

What is claimed is:

1. An electric junction box comprising:
    a box body;
    a tubular guide portion projecting from the box body and guiding a harness out of the box body;
    a plurality of wall portions provided in the guide portion and divided along an axial direction of the guide portion; and
    a spurtle and a bending portion provided in at least one of the plurality of wall portions, the bending portion being formed between the spurtle and the box body elastically deformable in the outside direction of the guide portion,
    wherein the inner diameter of the guide portion in neutral state that the bending portion is not in elastic deformation is formed to fit the harness with a minimum outer diameter, and
    wherein the bending portion is bent so that the spurtle is directed outward with the increase of the diameter of the harness.

2. The electric junction box as claimed in claim 1,
    wherein the spurtle includes a stand portion standing from the spurtle and stacked on the inner surface of the adjoining wall portion.

3. The electric junction box as claimed in claim 1 or 2,
    wherein the guide portion includes a rib formed convexly in the outside direction of the spurtle for preventing a fixing member wound continuously from the guide portion to the harness with the harness through the inside of the spurtle from being dislocated, and wherein the rib is spaced from an end portion of the guide portion away from the box body.

4. The electric junction box as claimed in claim 1,
    wherein the bending portion comprises a pair of second stands standing from the bending portion.

5. The electric junction box as claimed in claim 4,
    wherein the pair of the second stands are stacked on inner surfaces of the plurality of wall portions when positioned in the pair of side wall portion.

* * * * *